US010820158B2

(12) United States Patent
Dicke et al.

(10) Patent No.: US 10,820,158 B2
(45) Date of Patent: *Oct. 27, 2020

(54) SYSTEMS AND METHODS FOR LOCATION TRACKING NOTIFICATION

(71) Applicant: BlackBerry Limited, Waterloo (CA)

(72) Inventors: Ronald Anthony Dicke, Ottawa (CA); Robert Joseph Alain Guay, Gatineau (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/415,194

(22) Filed: May 17, 2019

(65) Prior Publication Data

US 2019/0274004 A1    Sep. 5, 2019

Related U.S. Application Data

(60) Continuation of application No. 15/899,178, filed on Feb. 19, 2018, now Pat. No. 10,299,069, which is a continuation of application No. 14/478,262, filed on Sep. 5, 2014, now Pat. No. 9,900,732, which is a division of application No. 12/432,371, filed on Apr. 29, 2009, now Pat. No. 8,849,314.

(51) Int. Cl.
*H04W 24/00* (2009.01)
*H04W 4/029* (2018.01)
(Continued)

(52) U.S. Cl.
CPC ........... *H04W 4/029* (2018.02); *G01S 5/0205* (2013.01); *H04W 4/02* (2013.01); *H04W 12/02* (2013.01);
(Continued)

(58) Field of Classification Search
CPC ....... H04W 64/00; H04W 4/02; H04W 8/245; H04L 29/08657; H04M 1/72525;
(Continued)

(56) References Cited

U.S. PATENT DOCUMENTS 6,311,069 B1   10/2001   Havinis et al.
6,411,891 B1   6/2002   Jones
(Continued)

FOREIGN PATENT DOCUMENTS

CN   1237315 A    12/1999
EP   1473959 A1   11/2004
(Continued)

OTHER PUBLICATIONS

About Sprint Family Locator, Sprint Family Locator: Compatible Mobile Phones, Jun. 18, 2006, 1 pages. Retrieved from the Internet:.
(Continued)

*Primary Examiner* — Danh C Le
(74) *Attorney, Agent, or Firm* — Borden Ladner Gervais LLP; Todd Keeler

(57) ABSTRACT

Systems and methods for location tracking notification are provided. Location sharing involves a mobile device sending location information to another device. This can allow another device to track the geographic location of the mobile device. Even though permissions can restrict access of the location information to only authorised users, the user of the mobile device might nonetheless wish to be informed of when another user is tracking their location. In accordance with an embodiment of the disclosure, if the location of the mobile device is being tracked, then the mobile device executes a user notification indicating that the location of the mobile device is being tracked. This can inform the user that their location is being tracked.

18 Claims, 10 Drawing Sheets

(51) Int. Cl.

| | | |
|---|---|---|
| *G01S 5/02* | (2010.01) | |
| *H04W 4/02* | (2018.01) | |
| *H04W 12/02* | (2009.01) | |
| *H04W 68/00* | (2009.01) | |
| *H04M 1/725* | (2006.01) | |
| *H04W 64/00* | (2009.01) | |
| *H04L 29/08* | (2006.01) | |
| *H04W 12/00* | (2009.01) | |

(52) U.S. Cl.
CPC .......... *H04W 68/00* (2013.01); *H04L 67/26* (2013.01); *H04M 1/72572* (2013.01); *H04M 2250/10* (2013.01); *H04W 12/00503* (2019.01); *H04W 64/00* (2013.01)

(58) Field of Classification Search
CPC ............ H04M 1/72522; G06Q 10/08; G07C 9/00111; G08B 21/0269
USPC ................. 455/456.5, 456.1, 418, 456.2
See application file for complete search history.

(56) References Cited

U.S. PATENT DOCUMENTS

| | | | |
|---|---|---|---|
| 6,438,370 B1 | 8/2002 | Einola et al. | |
| 6,587,782 B1 | 7/2003 | Nocek et al. | |
| 6,756,918 B2 | 6/2004 | Fomukong | |
| 6,795,823 B1 | 9/2004 | Aklepi et al. | |
| 6,885,874 B2 | 4/2005 | Grube et al. | |
| 6,975,873 B1* | 12/2005 | Banks | H04W 64/00 455/456.1 |
| 7,054,618 B1* | 5/2006 | McCullough | H04L 67/04 455/414.1 |
| 7,164,986 B2 | 1/2007 | Humphries et al. | |
| 7,212,829 B1 | 5/2007 | Lau et al. | |
| 7,224,987 B1 | 5/2007 | Bhela et al. | |
| 7,305,365 B1 | 12/2007 | Bhela et al. | |
| 7,339,469 B2 | 3/2008 | Braun et al. | |
| 7,395,075 B2 | 7/2008 | Posner et al. | |
| 7,528,714 B2* | 5/2009 | Schlesier | H04W 4/029 340/539.13 |
| 7,672,947 B2 | 3/2010 | Kerr et al. | |
| 7,729,854 B2* | 6/2010 | Muramatsu | G01C 21/3626 340/995.19 |
| 7,788,188 B2 | 8/2010 | Kramer et al. | |
| 7,809,377 B1 | 10/2010 | Lau et al. | |
| 7,826,830 B1 | 11/2010 | Patel et al. | |
| 7,973,655 B2 | 7/2011 | Blinnikka et al. | |
| 8,000,724 B1* | 8/2011 | Rayburn | G01S 5/0027 370/310 |
| 8,019,532 B2 | 9/2011 | Sheha et al. | |
| 8,112,100 B2 | 2/2012 | Frank et al. | |
| 8,619,685 B2 | 12/2013 | Chun et al. | |
| 8,655,383 B2* | 2/2014 | Feng | H04W 4/023 455/456.3 |
| 8,750,901 B1* | 6/2014 | Gupta | G06Q 20/3223 455/456.1 |
| 8,849,314 B2 | 9/2014 | Dicke et al. | |
| 9,900,732 B2 | 2/2018 | Dicke et al. | |
| 10,299,069 B2 | 5/2019 | Dicke et al. | |
| 2002/0145561 A1 | 10/2002 | Sandhu et al. | |
| 2002/0164993 A1* | 11/2002 | Elliot | H04W 4/02 455/456.1 |
| 2003/0036848 A1 | 2/2003 | Sheha et al. | |
| 2003/0078042 A1* | 4/2003 | Miriyala | H04W 4/02 455/435.1 |
| 2004/0039814 A1 | 2/2004 | Crabtree et al. | |
| 2004/0077359 A1* | 4/2004 | Bernas | H04W 8/08 455/456.1 |
| 2005/0054351 A1 | 3/2005 | McAlexander | |
| 2005/0076078 A1* | 4/2005 | Salton | G06Q 10/10 709/201 |
| 2005/0132016 A1 | 6/2005 | Boone et al. | |
| 2005/0136947 A1* | 6/2005 | Llombart-Juan | G01C 21/20 455/456.3 |
| 2005/0143099 A1 | 6/2005 | Piccioni | |
| 2006/0018295 A1 | 1/2006 | Choi et al. | |
| 2006/0136603 A1* | 6/2006 | Morvan | H04B 7/2687 709/248 |
| 2006/0187028 A1 | 8/2006 | Kiang et al. | |
| 2006/0255935 A1 | 11/2006 | Scalisi et al. | |
| 2006/0270421 A1 | 11/2006 | Phillips et al. | |
| 2006/0276175 A1 | 12/2006 | Chandran | |
| 2007/0015520 A1 | 1/2007 | Casey | |
| 2007/0018811 A1 | 1/2007 | Gollu et al. | |
| 2007/0024440 A1 | 2/2007 | Moran et al. | |
| 2007/0218891 A1* | 9/2007 | Cox | G01C 21/20 455/422.1 |
| 2007/0224977 A1 | 9/2007 | Yamaguchi et al. | |
| 2007/0244633 A1 | 10/2007 | Phillips et al. | |
| 2007/0249364 A1 | 10/2007 | Bells et al. | |
| 2008/0046326 A1 | 2/2008 | Horstemeyer | |
| 2008/0070593 A1 | 3/2008 | Altman et al. | |
| 2008/0153487 A1 | 6/2008 | Martin et al. | |
| 2008/0186165 A1 | 8/2008 | Bertagna et al. | |
| 2008/0201310 A1 | 8/2008 | Fitzpatrick et al. | |
| 2008/0274752 A1 | 11/2008 | Houri | |
| 2008/0287143 A1 | 11/2008 | Banks et al. | |
| 2009/0005018 A1* | 1/2009 | Forstall | H04M 3/42348 455/414.1 |
| 2009/0043501 A1 | 2/2009 | Lohi et al. | |
| 2009/0102668 A1 | 4/2009 | Thompson et al. | |
| 2009/0111487 A1 | 4/2009 | Scheibe | |
| 2009/0176509 A1 | 7/2009 | Davis et al. | |
| 2009/0191850 A1* | 7/2009 | Cardwell, III | G08B 25/016 455/412.2 |
| 2009/0201149 A1* | 8/2009 | Kaji | G01C 21/20 340/539.13 |
| 2009/0289844 A1* | 11/2009 | Palsgrove | A01K 15/021 342/357.55 |
| 2009/0325615 A1 | 12/2009 | McKay et al. | |
| 2010/0106801 A1 | 4/2010 | Bliss et al. | |
| 2010/0131642 A1 | 5/2010 | Chalikouras et al. | |
| 2010/0186069 A1* | 7/2010 | Liu | H04W 12/06 726/4 |
| 2010/0259611 A1 | 10/2010 | Keshavarzian et al. | |
| 2010/0273509 A1* | 10/2010 | Sweeney | G06Q 10/02 455/456.3 |
| 2010/0277611 A1* | 11/2010 | Holt | H04N 5/772 348/231.2 |
| 2010/0279647 A1* | 11/2010 | Jacobs | H04W 4/40 455/404.1 |
| 2010/0291952 A1* | 11/2010 | Gosset | H04W 4/02 455/466 |
| 2010/0293511 A1* | 11/2010 | Agnetta | G09G 5/003 715/864 |
| 2010/0323657 A1* | 12/2010 | Barnard | H04M 1/663 455/404.1 |
| 2011/0053605 A1* | 3/2011 | Carpio | G01S 5/0027 455/456.1 |
| 2011/0098048 A1* | 4/2011 | Zhang | H04W 4/029 455/438 |
| 2011/0106278 A1* | 5/2011 | Martin-Cocher | G06Q 10/06314 700/90 |
| 2011/0109434 A1* | 5/2011 | Hadsall, Sr. | G08B 21/22 340/8.1 |
| 2011/0117936 A1 | 5/2011 | Yuan | |
| 2011/0212780 A1* | 9/2011 | Odinot | G05G 1/04 463/37 |
| 2011/0227740 A1* | 9/2011 | Wohltjen | G07C 1/10 340/573.1 |
| 2012/0077475 A1 | 3/2012 | Holcomb et al. | |

FOREIGN PATENT DOCUMENTS

| | | |
|---|---|---|
| EP | 1480011 A1 | 11/2004 |
| EP | 1528714 A1 | 5/2005 |
| EP | 1840514 A1 | 10/2007 |
| EP | 1850606 A1 | 10/2007 |

(56) References Cited

FOREIGN PATENT DOCUMENTS

| WO | 9821913 A2 | 5/1998 |
|---|---|---|
| WO | 0221478 A2 | 3/2002 |
| WO | 03034765 A1 | 4/2003 |
| WO | 03053077 A1 | 6/2003 |
| WO | 2006118373 A1 | 11/2006 |
| WO | 2007002303 A1 | 1/2007 |

OTHER PUBLICATIONS

Blackberry Enterprise Server on Domino Discussion: GPS Reporting to BES Server in 4.1 SP3 IT Policy, [online], May 30, 2007. Retrieved from the Internet:, 3 pages.

Blackberry Tracker Free Live EPS Tracking & Anti-Theft with Geofence Alerts & GPS History for Blackberry, Retrieved from the Internet:, 4 pages.

Canadian Patent Application No. 2,701,230, Office Action dated Nov. 18, 2013.

Canadian Patent Application No. 2,701,998, Office Action dated Aug. 20, 2013.

Canadian Patent Application No. 2,701,998, Office Action dated May 14, 2014.

Chinese Patent Application No. 201010214789.2, Office Action dated Oct. 23, 2012—English Translation available.

Click for Country Daft Logic—Logic, but in a different way, Nov. 1, 2008 [online]. Retrieved from the Internet:.

European Patent Application No. 09159118.0, Search and Exam Report dated Sep. 30, 2009.

European Patent Application No. 09159121.4, European Search Report dated Apr. 1, 2010.

European Patent Application No. 09159123.0, European Search Report dated Mar. 8, 2010.

European Patent Application No. 09159123.0, Office Action dated Dec. 10, 2015.

European Patent Application No. 09159125, European Search Report dated Mar. 16, 2010.

Facebook Friends GPS: Track and locate Facebook Friends using Mobile GPS Co-ordinates, [online], Nov. 2007. Retrieved from the Internet: , 3 pages in total.

Global Locator for Geocoding Trillium Software, Dec. 21, 2008 [online]. Retrieved from the Internet:.

Google Maps Reverse Geocoder, Daft Logic—Logic, but in a different way, Feb. 21, 2008, 4 pages [online]. Retrieved from the Internet:.

Google Mobile "Google Latitude,": Latitude for your phone, 2 pages [online], Feb. 5, 2009. Retrieved from the Internet:.

Greenwell, "OMA and Location Based Services," OMA Mobile Alliance, London, Sep. 3-4, 2008, 26 pages in total.

Ku et al., "Location-based Spatial Queries with Data Sharing in Mobile Environments," University of Southern California, [online], Apr. 3-7, 2006, Retrieved from Internet , 22 pages.

Leonhardi et al., "A Comparison of Protocols for Updating Location Information," University of Stuttart, [online], Mar. 7, 2000. Retrieved from the Internet:, 13 pages.

Loop! Location-Sharing Joins Google Android Market, Loop! Location-Sharing Joins Google Android Market—GPS LBS, Dec. 2008, [online]. Retrieved from the Internet:, 3 pages.

Marshall et al., "Siliconbeat: A Blog Tool to Fence in Your Children," [online], Feb. 2005. Retrieved from the Internet:, 2 pages in total.

Mobile Codes Requirements, OMA Open Mobile Alliance OMA-RD-MC-V1-0-0-20081206-D, Draft Version 1.0.0, Dec. 6, 2008, pp. 2(34)-34(34).

MoosTrax GPS Tracking for Mobile Devices, [online], Feb. 1, 2009. Retrieved from the Internet:, 2 pages.

Muthukrishnan et al., "WLAN Location Sharing Through a Privacy Observant Architecture," University of Iwente, [online], Jan. 8-12, 2006, Retrieved from the Internet:, 10 pages.

Pitoura et al., "Locating Objects in Mobile Computing," University of Loannina, Jul. 2001. 43 pages in total [online]. Retrieved from the Internet:.

Schilit et al., "Disseminating Active Map Information to Mobile Hosts," Columbia University, [online], Sep. 1994. Retrieved from the Internet:, 23 pages.

Trackr! GPS tracking, Aug. 16, 2007, 1 pages [online]. Retrieved from the Internet:.

U.S. Appl. No. 15/899,178, Notice of Allowance dated Jan. 7, 2019.

U.S. Appl. No. 15/899,178, Second Final Office Action dated Oct. 16, 2018.

U.S. Appl. No. 15/899,178, First Non-Final Office Action dated May 31, 2018.

U.S. Appl. No. 12/432,226, Office Action dated Mar. 13, 2013.

U.S. Appl. No. 12/432,226, Office Action dated Nov. 22, 2011.

U.S. Appl. No. 12/432,226, Office Action dated Oct. 25, 2012.

U.S. Appl. No. 12/432,412, Office Action dated Feb. 24, 2012.

U.S. Appl. No. 12/432,412, Office Action dated Jul. 11, 2011.

U.S. Appl. No. 12/432,412, Office Action dated May 8, 2013.

U.S. Appl. No. 12/432,412, Office Action dated Sep. 25, 2011.

U.S. Appl. No. 12/432,428, Office Action dated Jun. 21, 2011.

U.S. Appl. No. 14/478,262, Non-Final Office Action dated Jun. 16, 2017.

U.S. Appl. No. 14/478,262, Notice of Allowance dated Oct. 12, 2017.

Wavemarket, Wavemarket, Inc., [online], Nov. 11, 2006. Retrieved from the Internet:, 2 pages.

WhosHere, WhosHere Overview—myRete—Mobile Proximity Networking—Now Wherever you Are!, [online], Oct. 15, 2008. Retrieved from the Internet:.

Witteman, "Efficient Proximity Detection Among Mobile Clients Using the GSM Network", Alcatel-Lucent, http://dacs.ewi.utwente.nl/assignments/completed/master/reports/2007-witteman.pdf, 83 pages in total.

* cited by examiner

US 10,820,158 B2

SYSTEMS AND METHODS FOR LOCATION TRACKING NOTIFICATION

CROSS REFERENCE TO RELATED APPLICATIONS

This application is a continuation of U.S. application Ser. No. 15/899,178 filed Feb. 19, 2018, which is a continuation of U.S. application Ser. No. 14/478,262 filed Sep. 5, 2014, now U.S. Pat. No. 9,900,732, which is a divisional of U.S. application Ser. No. 12/432,371 filed Apr. 29, 2009, now U.S. Pat. No. 8,849,314, all of which are incorporated herein by reference.

FIELD OF THE DISCLOSURE

The application relates to mobile devices, and more particularly to tracking the geographic location of one or more mobile devices.

BACKGROUND

A location-based service (LBS) is an information and entertainment service that makes use of the geographical position of one or more mobile devices. Some applications involve tracking the geographic location of one or more mobile devices. In order for a communication device to track the location of a mobile device, the communication device receives location information from which the geographical location of the mobile device can be determined. The location information can be generated by the mobile device using GPS technology or by other means. The communication device can receive location information on an ongoing basis in order to keep up to date on the geographical location of the mobile device.

Privacy can be a concern when providing location information. One approach is to implement permissions for accessing location information. This can prevent unauthorised users from accessing location information of a mobile device, as only authorised users can access the location information.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to an aspect, there is provided a method for execution in a server, the method comprising: receiving location information of a mobile device; providing the location information to at least one other device; and sending a message to the mobile device identifying who or what is tracking the location of the mobile device.

According to another aspect, there is provided a computer readable medium having computer executable instructions stored thereon for execution on a processor of a server so as to implement a method comprising: receiving location information of a mobile device; providing the location information to at least one other device; and sending a message to the mobile device identifying who or what is tracking the location of the mobile device.

According to another aspect, there is provided a server comprising: a processor; and a location tracking informer configured for: receiving location information of a mobile device; providing the location information to at least one other device; and sending a message to the mobile device identifying who or what is tracking the location of the mobile device.

Other aspects and features of the present disclosure will become apparent, to those ordinarily skilled in the art, upon review of the following description of the specific embodiments of the invention.

Systems for Location Tracking Notification

Figure 1:
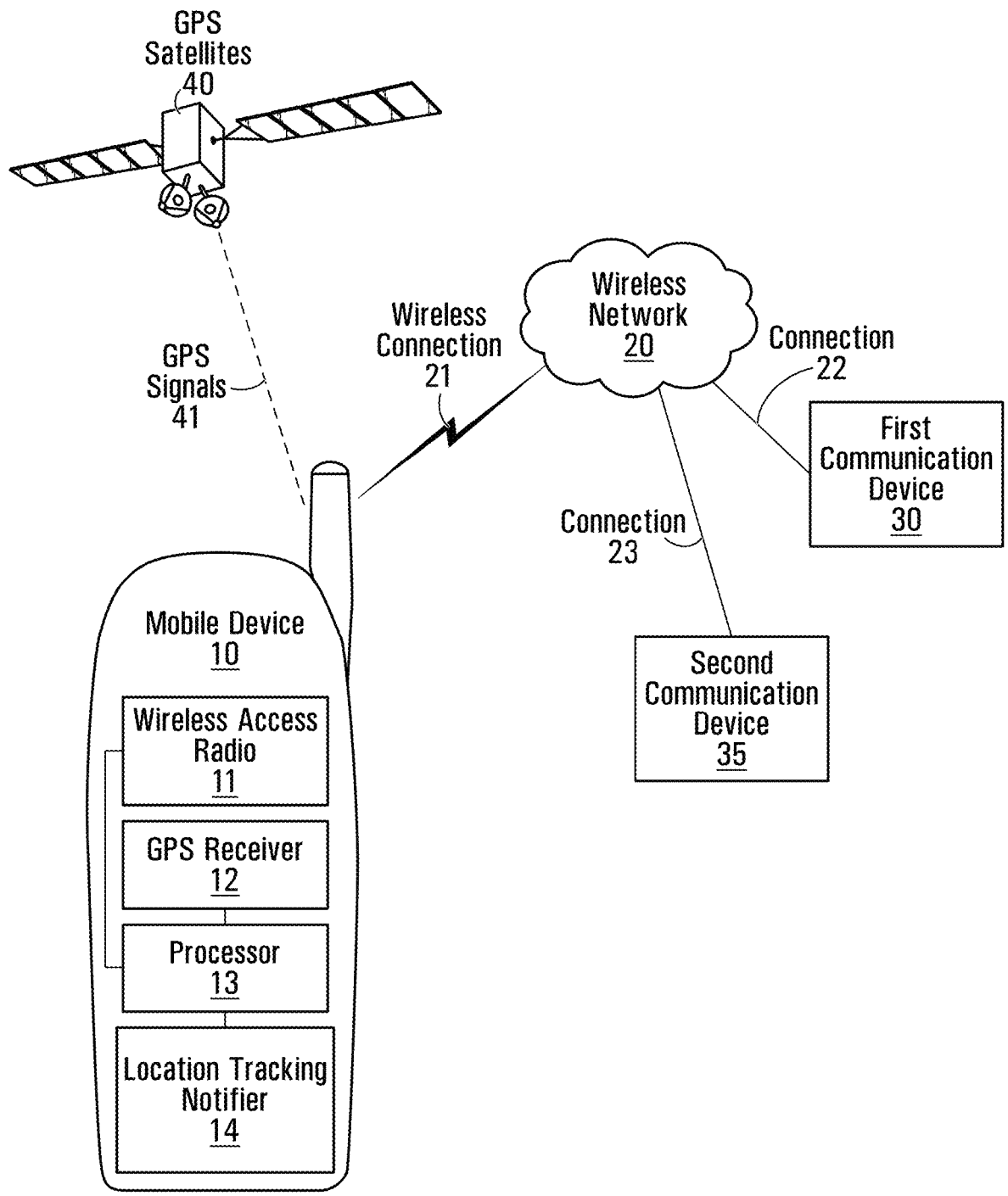
FIG. 1 is a block diagram of an example communication system featuring peer-to-peer communication.

Turning now to FIG. 1, shown is a block diagram of an example communication system featuring peer-to-peer communication. The communication system has a wireless network 20, and a plurality of devices 10,30,35 including a mobile device 10 and other communication devices 30,35. There might be other devices, but they are not shown for simplicity. The mobile device 10 has a wireless access radio 11, a GPS receiver 12, a processor 13, a location tracking notifier 14, and might have other components but they are not shown for simplicity. Details of the other communication devices 30,35 are omitted for simplicity. There are a plurality of GPS satellites 40 (only one shown for simplicity) for those devices that are GPS-enabled, for example the mobile device 10.

The operation of the communication system will now be described by way of example. Communication between the devices 10,30,35 is through the wireless network 20. The mobile device 10 uses its wireless access radio 11 for communicating wirelessly over a wireless connection 21, while the other communication devices 30,35 communicate over respective connections 22,23. The connections 22,23 can be wireless or wired depending on whether the communication devices 30,35 are mobile. For this example, it is assumed that the communication between the devices 10,30,35 is performed in a peer-to-peer manner. However, alternative implementations are possible. An example featuring communication in a server-based manner is described later with reference to FIG. 2.

The mobile device 10 generates location information using GPS technology, which involves receiving GPS signals 41 from the GPS satellites 40 using its GPS receiver 12. Location sharing involves the mobile device 10 sending the location information to another device, for example one of the other communication devices 30,35. This can allow another device to track the geographic location of the mobile device 10.

Privacy can be a concern when providing the location information. One approach is to implement permissions for accessing the location information. For example, the user might have a set of rules indicating who can access their location information. This can prevent unauthorised users from accessing the location information. However, even though permissions can restrict access of the location information to only authorised users, the user of the mobile device 10 might nonetheless wish to be informed of when another user is tracking their location.

In accordance with an embodiment of the disclosure, if the location of the mobile device 10 is being tracked, then the location tracking notifier 14 executes a user notification indicating that the location of the mobile device 10 is being tracked. This can inform the user that their location is being tracked.

There are many ways to determine whether the location of the mobile device 10 is being tracked. In some implementations, the mobile device 10 determines that each device to which the location information is sent is tracking the location of the mobile device 10. For example, if the mobile device 10 provides the location information to the first communication device 30, then the mobile device 10 determines that the first communication device 30 is tracking its location. Since the location information is provided to the first communication device 30 in a peer-to-peer manner, the mobile device 10 is aware that the location information is sent to the first communication device 30.

In some implementations, if a communication device is not presently tracking the location of the mobile device, then the communication device indicates this to the mobile device 50. Thus, the mobile device 50 can avoid sending location information to the communication device even though the communication device might have permission to the location information. For those communication devices that are receiving the location information and do not indicate that the location information is not needed, then it is assumed that they are tracking the location of the mobile device 10.

In some implementations, the user notification identifies who or what is tracking the location of the mobile device. In some implementations, the user notification identifies each device to which the location information is sent. For example, if the mobile device 10 provides the location information to the first communication device 30, then the user notification identifies the first communication device 30. The identification is provided in a manner that distinguishes from other devices such as the second communication device 35. As an alternative, the user notification can identify the user of each device to which the location information is sent. This serves to inform the user of the mobile device 10 of who is tracking its location. As another alternative, the user notification can identify a tracking application operating on each device to which the location information is sent. Any appropriate combination is also possible, for example the user notification can identify a device to which the location information is sent together with the user of that device.

In the illustrated example, the location tracking notifier 14 is implemented as software and is executed on the processor 13. However, more generally, the location data provider 14 may be implemented as software, hardware, firmware, or any appropriate combination thereof.

Further details of notifying a user that its location is being tracked by another device in a peer-to-peer architecture are provided later with reference to FIG. 4.

Figure 2:
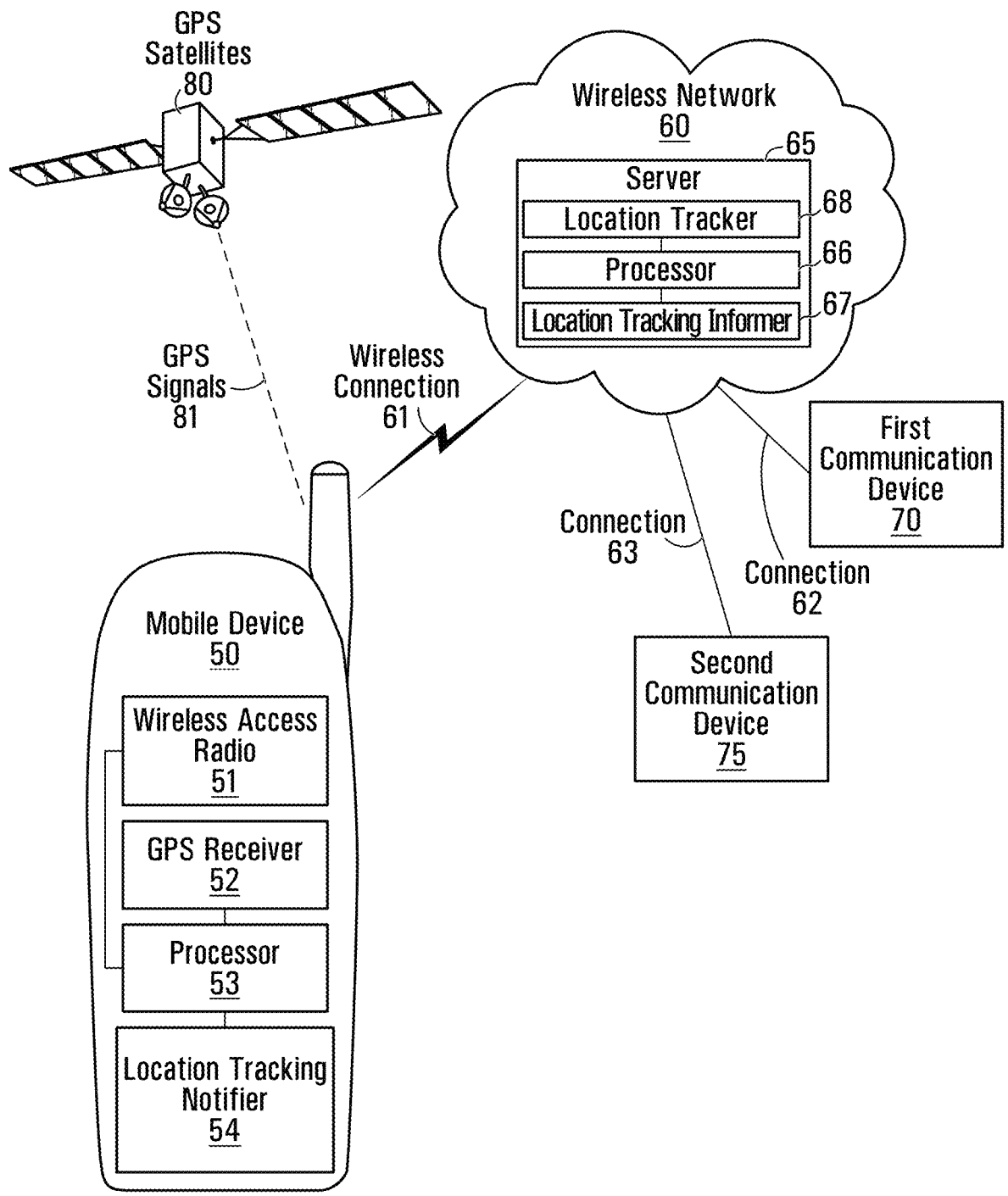
FIG. 2 is a block diagram of an example communication system featuring server-based communication.

Turning now to FIG. 2, shown is a block diagram of an example communication system featuring server-based communication. The communication system has a wireless network 60, and a plurality of devices 50,30,35 including a mobile device 50 and other communication devices 70,75. There might be other devices, but they are not shown for simplicity. The mobile device 50 has a wireless access radio 51, a GPS receiver 52, a processor 53, a location tracking notifier 54, and might have other components but they are not shown for simplicity. Details of the other communication devices 70,75 are omitted for simplicity. The wireless network 60 has a server 65, which has a processor 66, a location tracking informer 67, a location tracker 68, and might have other components but they are not shown for simplicity. The server 65 is shown to part of the wireless network 60. In alternative configurations, the server 65 does not form part of the wireless network 60 and is instead coupled to the wireless network 60. There are a plurality of GPS satellites 80 (only one shown for simplicity) for those devices that are GPS-enabled, for example the mobile device 50.

The operation of the communication system will now be described by way of example. Communication between the devices 50,70,75 is through the server 65 of the wireless network 60. The mobile device 50 uses its wireless access radio 51 for communicating wirelessly over a wireless connection 61, while the other communication devices 70,75 communicate over respective connections 62,63. The connections 62,63 can be wireless or wired depending on whether the communication devices 70,75 are mobile. For this example, it is assumed that the communication between the devices 50,70,75 is performed in a server-based manner. However, alternative implementations are possible. An example featuring communication in a peer-to-peer manner was described earlier with reference to FIG. 1.

The mobile device 50 generates location information using GPS technology, which involves receiving GPS signals 81 from the GPS satellites 80 using its GPS receiver 52. Location sharing involves the mobile device 50 sending the location information to the server 65, which in turn provides the location information to another device. For example, the location tracker 68 of the server 65 might operate to provide the location information to one of the other communication devices 70,75. Location sharing can allow another device to track the geographic location of the mobile device 50.

Privacy can be a concern when providing the location information. One approach is to implement permissions for accessing the location information. This can prevent unauthorised users from accessing the location information. However, even though permissions can restrict access of the location information to only authorised users, the user of the mobile device 50 might nonetheless wish to be informed of when another user is tracking their location.

In accordance with an embodiment of the disclosure, if the location of the mobile device 50 is being tracked, then the location tracking notifier 54 executes a user notification indicating that the location of the mobile device 50 is being tracked. This can inform the user that their location is being tracked.

There are many ways to determine whether the location of the mobile device 50 is being tracked. In some implementations, the mobile device 50 determines that another device is tracking the location of the mobile device 50 based on the location information being sent to the server 65. Since the location information is provided in a server-based manner, the mobile device 50 might not be aware of which devices are tracking its location. However, the server 65 is aware of which devices are provided with the location information. According to another embodiment of the disclosure, the location tracking informer 67 of the server 67 operates to send a message to the mobile device 50 identifying who or what is tracking the location of the mobile device 50. Upon receiving the message, the mobile device 50 becomes aware of who or what is tracking the location of the mobile device.

In some implementations, if a communication device is not presently tracking the location of the mobile device, then the communication device indicates this to the server 65. Thus, the server 65 can avoid sending location information to the communication device even though the communication device might have permission to the location information. For those communication devices that are receiving the location information and do not indicate that the location information is not needed, then it is assumed that they are tracking the location of the mobile device 10.

In the illustrated example, the location tracking informer 67 of the server 65 is implemented as software and is executed on the processor 66. However, more generally, the location tracking informer 67 may be implemented as software, hardware, firmware, or any appropriate combination thereof. In some implementations, the server 65 is a Presences Server.

In some implementations, the user notification executed by the mobile device 50 identifies who or what is tracking the location of the mobile device. The identification of who or what is tracking the location of the mobile device might depend on what information is provided by the server. For example, if the server 65 indicates to the mobile device 50 that the location information was provided to the first communication device 70, then the user notification can identify the first communication device 70. The identification can be provided in a manner that distinguishes from other devices such as the second communication device 75. As another example, if the server 65 identifies the user of the first communication device 70, then the user notification can identify that user. This serves to inform the user of the mobile device 50 of who is tracking its location. As another example, if the server 65 identifies a tracking application operating on the first communication device 70, then the user notification identifies that application. Any appropriate combination is also possible, for example the user notification can identify a device to which the location information is sent together with the user of that device.

In the illustrated example, the location tracking notifier 54 of the mobile device 50 is implemented as software and is executed on the processor 53. However, more generally, the location data provider 54 may be implemented as software, hardware, firmware, or any appropriate combination thereof.

Further details of notifying a user that its location is being tracked by another device in a server-based architecture are provided later with reference to FIG. 5 and FIG. 6.

In the illustrated examples presented above with reference to FIG. 1 and FIG. 2, details of the wireless networks 20,60 have been omitted. It is to be understood that the wireless networks 20,60 would have any appropriate combination of components suitable for a wireless network. Note that the wireless networks 20,60 may include wires in spite of having components for wireless communication. The components of the wireless networks 20,60 are implementation specific and may depend on the type of wireless network. Any appropriately configured wireless network can be used. In specific implementations, the wireless networks 20,60 are GSM (Global System for Mobile communications)/EDGE (Enhanced Data rates for GSM Evolution)/3G or CDMA (Code Division Multiple Access) networks. In other implementations, the wireless networks 20,60 are WiFi networks. Other implementations are possible.

In the illustrated examples presented above with reference to FIG. 1 and FIG. 2, it is assumed that at least some of the devices are GPS-enabled for determining geographic location. Whilst examples presented herein focus on use of GPS, it is to be understood that alternative means for determining geographic location are possible and are within the scope of this disclosure. For example, geographic location can alternatively be determined based on cell/sector identification within cellular network. As another example, geographic location can be determined using triangulation of signals from in-range base towers, such as those used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Coarser location information can be obtained not only be triangulating the device's position based on nearby cell towers but also based on nearby Wi-Fi access points via a WLAN radio. As an alternative example, geographic location can be determined based on bar codes. Each bar code is located in a predefined location and encodes location information for that location. A mobile device, upon scanning/taking picture of one of these bar codes, can obtain the location information. The bar codes can be 1-dimensional, or 2-dimensional. Other means for determining geographic location may be possible.

In the examples presented herein, reference is made to "location information" of a mobile device. It is to be understood that there are many possibilities for the location information. In specific implementations, the location information is presence information. In some implementations, the location information includes coordinates of the location of the mobile device. The coordinates might for example be derived using GPS technology. More generally, the location information includes any suitable information from which the location of the mobile device can be determined.

Methods for Location Tracking Notification

Figure 3:
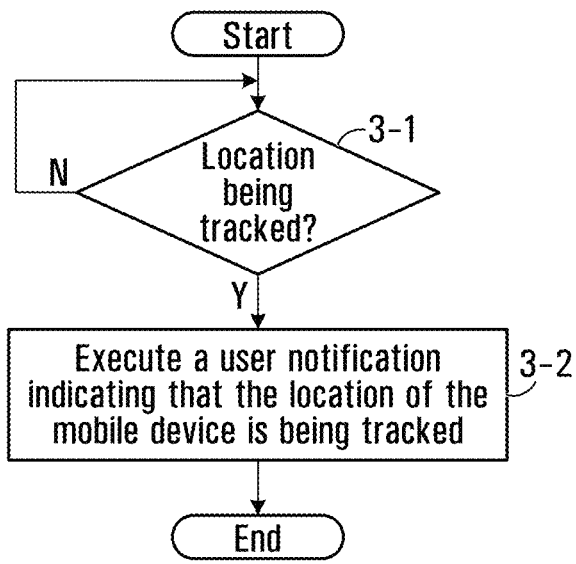
FIG. 3 is a flowchart of a method of notifying a user that its location is being tracked by another device.

Referring now to FIG. 3, shown is a flowchart of a method of notifying a user that its location is being tracked by another device. This method may be implemented in a mobile device, for example by the location tracking notifier 14 of the mobile device 10 shown in FIG. 1. Alternatively, this method may be implemented by the location tracking notifier 54 of the mobile device 51 shown in FIG. 2. More generally, this method may be implemented in any appropriately configured mobile device.

At step 3-1, the mobile device determines whether its location is being tracked by at least one other device. As noted above, even if authorised users have permission to track the location of the mobile device, the user of the mobile device might nonetheless wish to be informed of when another user is tracking their location. Therefore, in accordance with an embodiment of the disclosure, if the location of the mobile device is being tracked, then at step 3-2 the mobile device executes a user notification indicating that its location is being tracked.

There are many ways for the mobile device to determine whether its location is being tracked. In some implementations, if the mobile device sends its location data, then the mobile device determines that its location is being tracked. The manner in which the location data is sent might depend on whether the mobile device communicates with other devices in a peer-to-peer architecture or in a server-based architecture. An example in which location data is sent in a peer-to-peer architecture is provided below with reference to FIG. 4. An example in which location data is sent in a server-based architecture is provided below with reference to FIG. 5. In other implementations, if the mobile device accepts a request for location data, then the mobile device determines that its location is being tracked, even if its location information has yet to be sent. An example of this is described below with reference to FIG. 7. Other implementations are possible.

There are many ways for the mobile device to execute the user notification indicating that its location is being tracked. In some implementations, the user notification includes any one or more of visual notification (e.g. LED, screen icon, screen text, etc.), audio notification (e.g. chime, ring, etc.), and tactile notification (e.g. vibrate, etc.). Any suitable notification from which the user can understand that its location is being tracked can be implemented. In alternative implementations, the user notification comprises transmission of a message, for example SMS, instant messaging, or email, for indicating that the location of the mobile device is being tracked. The message can be received by the user of the mobile device in order to inform the user that the location of the mobile device is being tracked. Other implementations are possible.

In some implementations, the user notification identifies who or what is tracking the location of the mobile device, examples of which have been provided. The manner in which the mobile device determines who is tracking its location might depend on whether the mobile device communicates with other devices in a peer-to-peer architecture or in a server-based architecture. An example in which the mobile device determines who is tracking its location in a peer-to-peer architecture is provided below with reference to FIG. 4. An example in which the mobile device determines who is tracking its location in a server-based architecture is provided below with reference to FIG. 5. In alternative implementations, no indication is provided as to who is tracking the location of the mobile device. Other implementations are possible.

Figure 4:
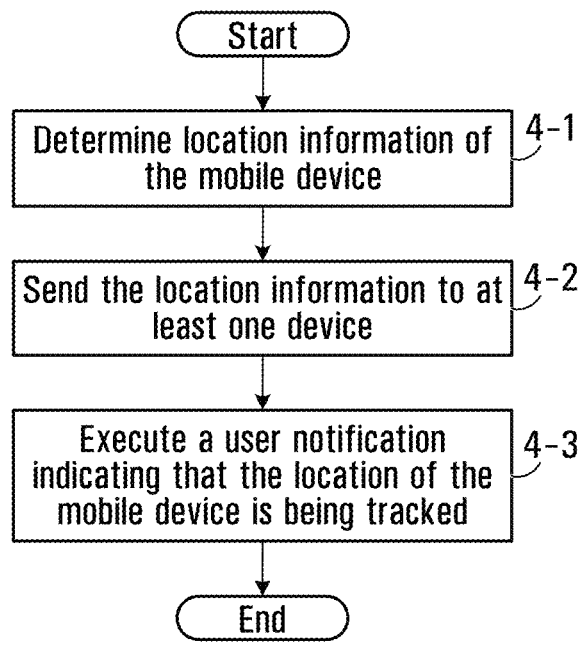
FIG. 4 is a flowchart of a method of notifying a user that its location is being tracked by another device in a peer-to-peer architecture.

Referring now to FIG. 4, shown is a flowchart of a method of notifying a user that its location is being tracked by another device in a peer-to-peer architecture. This method may be implemented in a mobile device, for example by the location tracking notifier 14 of the mobile device 10 shown in FIG. 1. More generally, this method may be implemented in any appropriately configured mobile device.

At step 4-1, the mobile device determines location information of the mobile device. At step 4-2, the mobile device sends the location information to at least one device. As noted above, even if authorised users have permission to track the location of the mobile device, the user of the mobile device might nonetheless wish to be informed of when another user is tracking their location. Therefore, in accordance with an embodiment of the disclosure, at step 4-3 the mobile device executes a user notification indicating that its location is being tracked.

Generally speaking, the location information is provided upon an event that triggers the mobile device to send the location information. The event might for example be a request for the location information. Alternatively, the event might for example be a condition being satisfied for sending the location information. For instance, if the mobile device is to provide location information upon traveling at least a minimum amount of distance, then travelling the minimum amount of distance triggers the mobile device to provide location information. The mobile device might have a set of rules for providing location information upon satisfaction of one or more conditions.

In some implementations, the user notification identifies who or what is tracking the location of the mobile device, examples of which have been provided. Since the location information is provided to each device in a peer-to-peer manner, the mobile device is aware of each device receiving the location information. The user notification can therefore inform the user of who is tracking its location.

Figure 5:
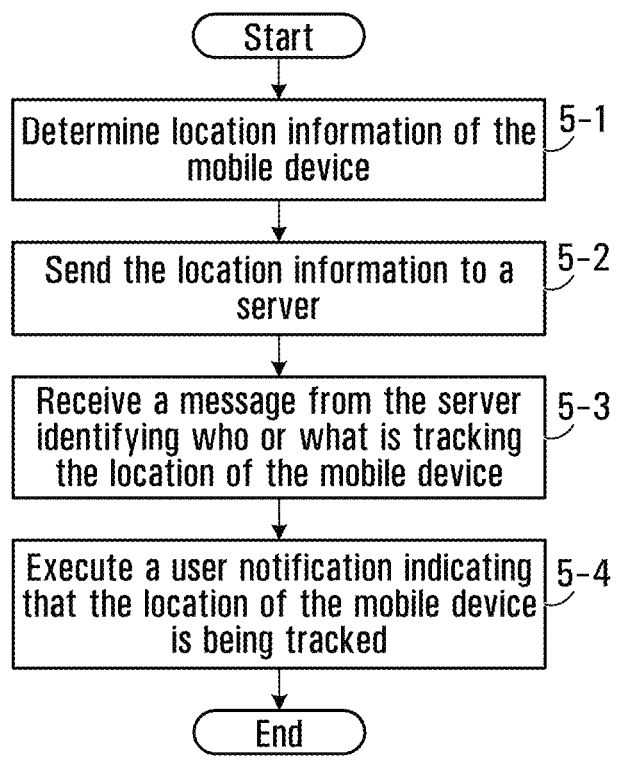
FIG. 5 is a flowchart of a method of notifying a user that its location is being tracked by another device in a server-based architecture.

Referring now to FIG. 5, shown is a flowchart of a method of notifying a user that its location is being tracked by another device in a server-based architecture. This method may be implemented in a mobile device, for example by the location tracking notifier 54 of the mobile device 51 shown in FIG. 2. More generally, this method may be implemented in any appropriately configured mobile device.

At step 5-1, the mobile device determines location information of the mobile device. At step 5-2, the mobile device sends the location information to a server. In some implementations, as indicated at step 5-3, the mobile device receives a message from the server identifying who or what is tracking the location of the mobile device. In alternative implementations, no such message is received in which case the mobile device might not know who or what is tracking its location, but nonetheless assumes that at least one other device is tracking its location. As noted above, even if authorised users have permission to track the location of the mobile device, the user of the mobile device might nonetheless wish to be informed of when another user is tracking their location. Therefore, in accordance with an embodiment of the disclosure, at step 5-4 the mobile device executes a user notification indicating that its location is being tracked.

Generally speaking, the location information is provided upon an event that triggers the mobile device to send the location information. The event might for example be a request for the location information. Alternatively, the event might for example be a condition being satisfied for sending the location information. For instance, if the mobile device is to provide location information upon traveling at least a minimum amount of distance, then travelling the minimum amount of distance triggers the mobile device to provide location information. The mobile device might have a set of rules for providing location information upon satisfaction of one or more conditions.

In some implementations, the user notification identifies who or what is tracking the location of the mobile device, examples of which have been provided. The mobile device might determine who or what is tracking the location of the mobile device, for example based on the message received at step 5-3. The user notification can therefore inform the user of who or what is tracking its location.

Figure 6:
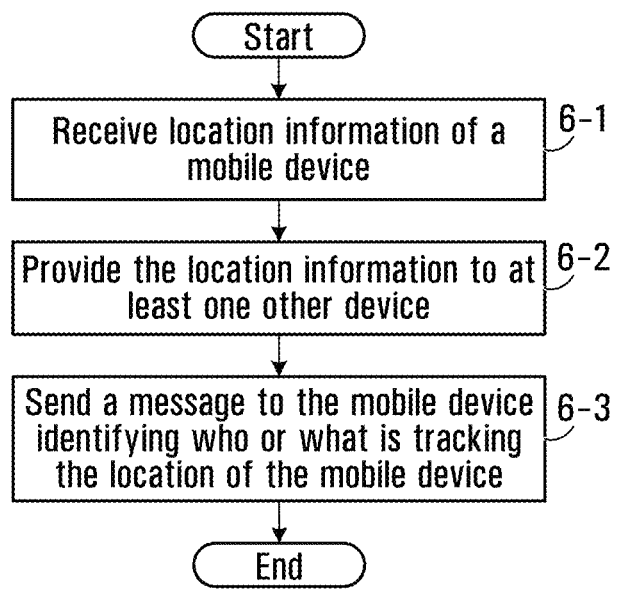
FIG. 6 is a flowchart of a method for a server to report each device that is tracking the location

Referring now to FIG. 6, shown is a flowchart of a method for a server to report each device that is tracking the location. This method may be implemented in server, for example by the location tracking informer 67 of the server 65 shown in FIG. 2. More generally, this method may be implemented in any appropriately configured server.

At step 6-1, the server receives location information of the mobile device. At step 6-2, the server provides the location information to at least one other device. In some implementations, each device has been determined to have permission to obtain the location information. However, even if authorised users have permission to track the location of the mobile device, the user of the mobile device might nonetheless wish to be informed of who is tracking their location. Therefore, in accordance with an embodiment of the disclosure, at step 6-3 the server sends a message to the mobile device identifying who or what is tracking the location of the mobile device.

In the examples presented above, it is assumed that a mobile device executes a user notification around the time that location information is provided. In other implementations, the mobile device executes a user notification upon granting a request for the location information, even if location information might not be provided for a while. In some instances, location information might be provided much later than the time of the request. However, the user of the mobile device might nonetheless wish to be promptly notified that its location is being tracked. An example of executing a user notification upon granting a request for the location information is provided below with reference to FIG. 7.

Figure 7:
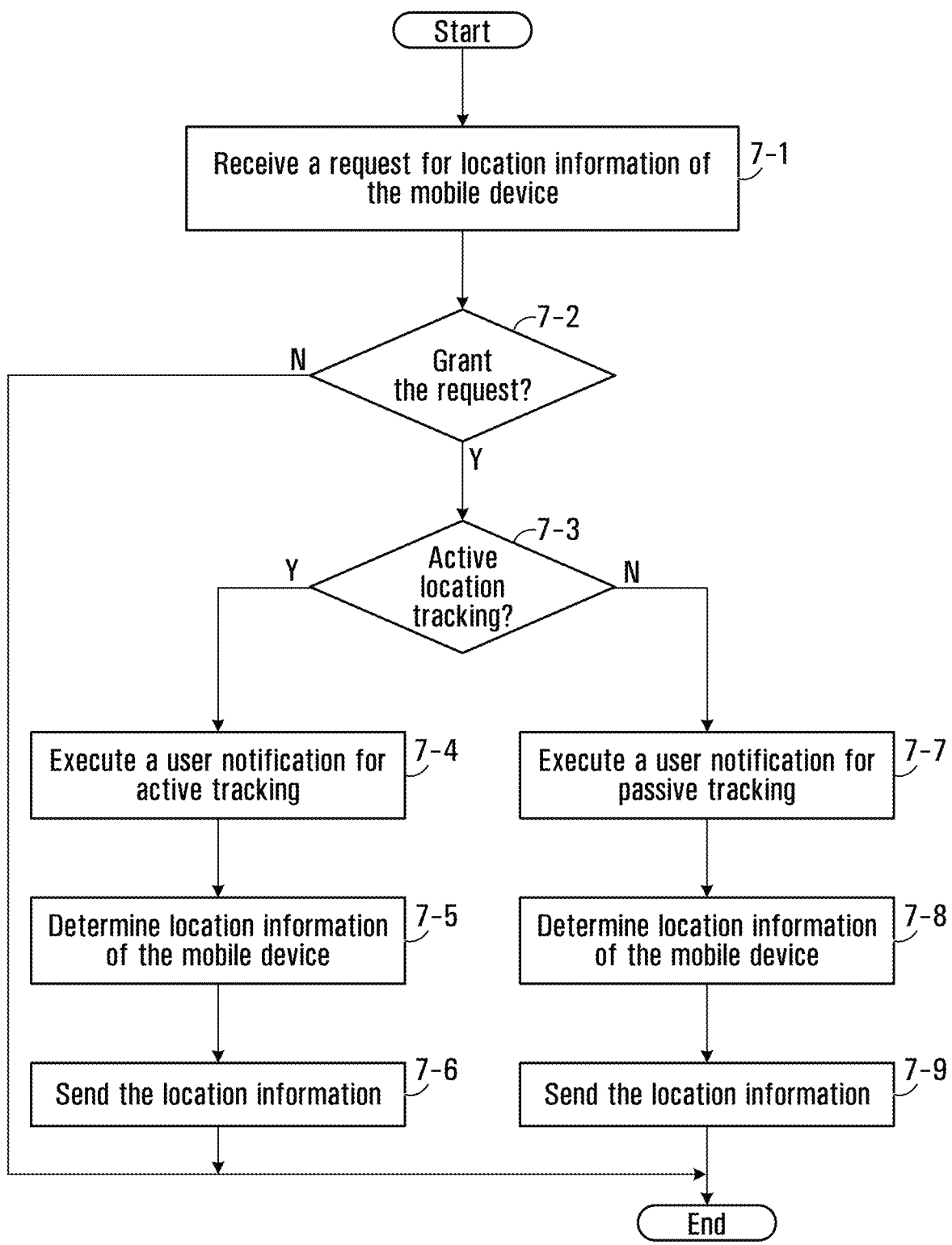
FIG. 7 is a flowchart of another method of notifying a user that its location is being tracked by another device.

Referring now to FIG. 7, shown is a flowchart of another method of notifying a user that its location is being tracked by another device. This method may be implemented in a mobile device, for example by the location tracking notifier 14 of the mobile device 10 shown in FIG. 1. Alternatively, this method may be implemented by the location tracking notifier 54 of the mobile device 51 shown in FIG. 2. More generally, this method may be implemented in any appropriately configured mobile device.

At step 7-1, the mobile device receives a request for location information. At step 7-2, the mobile device determines whether to grant the request. This might for example involve determining whether a source of the request has permission to track the location of the mobile device. If the request is not granted, then the method ends. In alternative implementations, if the request is not granted, then mobile device executes a user notification indicating that a request for location information has been denied. This can inform the user that there was an attempt to track its location.

However, if the request is granted, then the mobile device determines that another device is tracking its location. As noted above, even if authorised users have permission to track the location of the mobile device, the user of the mobile device might nonetheless wish to be informed of when another user is tracking their location. Therefore, in accordance with an embodiment of the disclosure, the mobile device executes a user notification indicating that its location is being tracked. In some implementations, the user notification identifies who or what initiated the request. This serves to inform the user of the mobile device as to who or what is tracking its location.

In some implementations, as indicated at step 7-3, the mobile device determines a type of location tracking. This allows the mobile device to execute the user notification based on the type of location tracking. In a specific example, if at step 7-3 the mobile device determines that its location is being actively tracked, then at step 7-4 the mobile device executes a user notification that is associated with active tracking. Conversely, if at step 7-3 the mobile device determines that its location is being passively tracked, then at step 7-7 the mobile device executes a user notification that is associated with passive tracking. Details of active location tracking and passive location tracking are described below.

Active location tracking might for example involve periodically providing location information in response to one request, namely the request received at step 7-2. Therefore, the mobile device periodically determines location information at step 7-5 and periodically provides the location information at step 7-6. Alternatively, active location tracking might involve providing location information in response to each of a plurality of requests, one of which being the request received at step 7-2. In any case, the device to which the location information is sent actively tracks the location of the mobile device.

Passive location tracking might for example involve providing location information only upon a condition other than a request being satisfied. For example, the request received at step 7-2 might be a geofence request, which indicates that location information is not needed until the mobile device leaves a geofence. Therefore, prior to the mobile device leaving the geofence, the mobile device does not provide any location information. As another example, the request received at step 7-2 might indicate that location information is not needed until the mobile device moves at least a minimum amount of distance from its current position. As another example, the request received at step 7-2 might indicate that location information is not needed until the mobile device becomes within proximity of another object. These examples differ from active location tracking because there is reliance on the mobile device to determine when to provide location information. Other forms of passive tracking are possible.

Examples have been provided for informing a user of a mobile device when their location is being tracked by another user. The user of the mobile device might also wish to know when the other user is no longer tracking their location. Example methods of notifying the user that their location is no longer being tracked are provided below.

Figure 8:
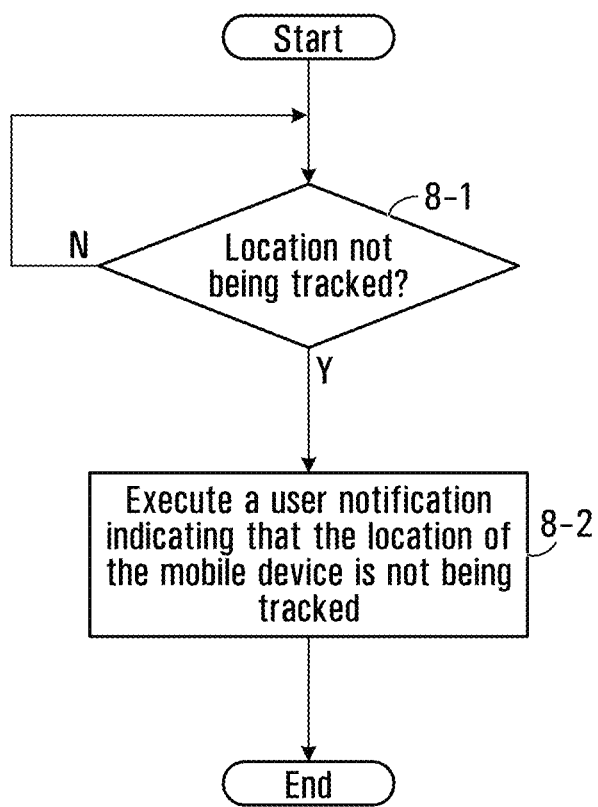
FIG. 8 is a flowchart of a method of notifying a user that its location is no longer being tracked by another device.

Referring now to FIG. 8, shown is a flowchart of a method of notifying a user that their location is no longer being tracked by another device. This method may be implemented in a mobile device, for example by the location tracking notifier 14 of the mobile device 10 shown in FIG. 1. Alternatively, this method may be implemented by the location tracking notifier 54 of the mobile device 51 shown in FIG. 2. More generally, this method may be implemented in any appropriately configured mobile device.

The method will be described with the assumption that at least one device was tracking the location of the mobile device. However, it is noted that this is not a requirement for the method. At step 8-1, the mobile device determines whether the location of the mobile device is no longer being tracked by the at least one device. If the location of the mobile device is no longer being tracked by the at least one device, then at step 8-2 the mobile device executes a user notification indicating that the location of the mobile device is no longer being tracked by the at least one device.

By informing a user that its location is being tracked by another device, and subsequently informing the user that its location is no longer being tracked by the other device, the user can be informed in real-time as to who or what is tracking their location. An example method of notifying a user in real-time when their location is being tracked by another device is described below.

Figure 9:
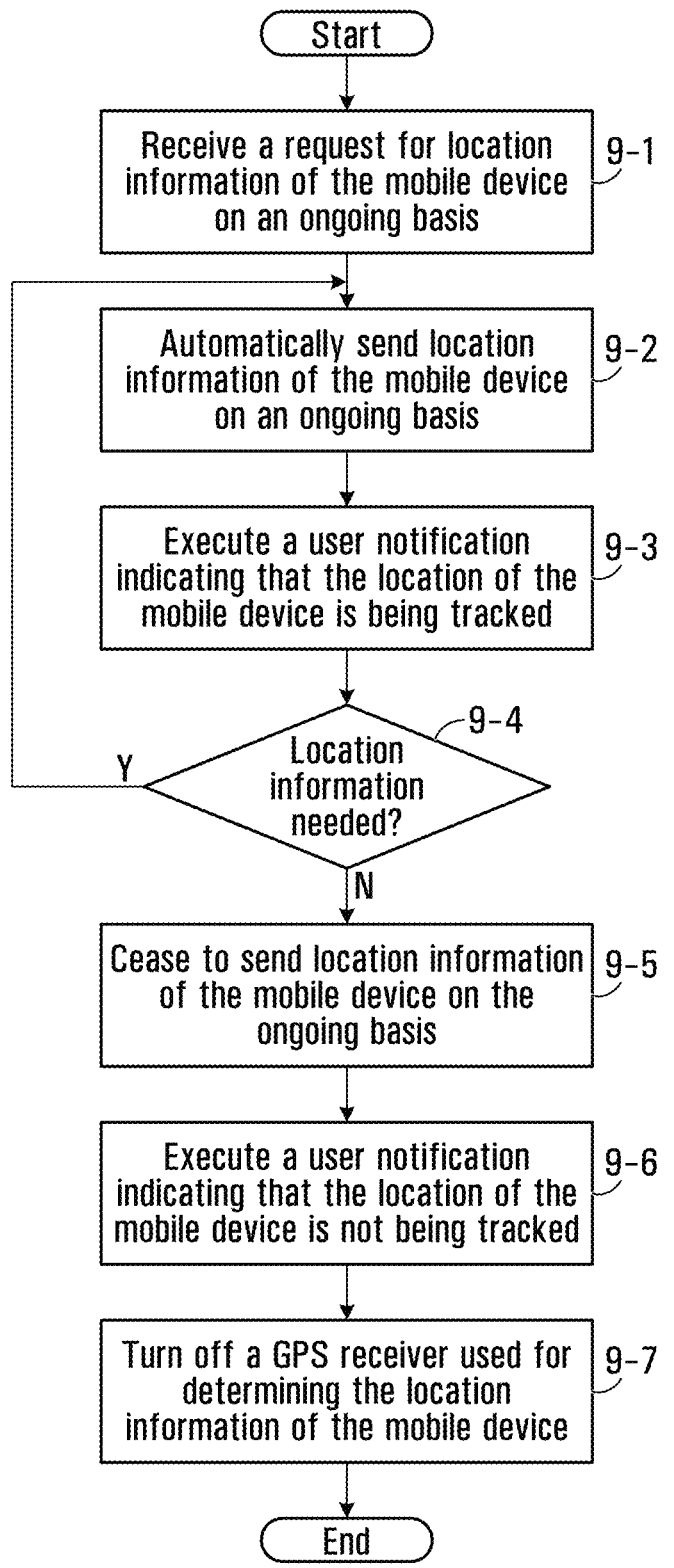
FIG. 9 is a flowchart of a method of notifying a user in real-time when its location is being tracked by another device.

Referring now to FIG. 9, shown is a flowchart of a method of notifying a user in real-time when their location is being tracked by another device. This method may be implemented in a mobile device, for example by the location tracking notifier 14 of the mobile device 10 shown in FIG. 1. Alternatively, this method may be implemented by the location tracking notifier 54 of the mobile device 51 shown in FIG. 2. More generally, this method may be implemented in any appropriately configured mobile device.

In some implementations, as indicated at step 9-1, the mobile device receives a request for location information of the mobile device on an ongoing basis. This request might be received for example because a tracking application of a communication device is to track the location of the mobile device. If the request is granted, then at step 9-2 the mobile device automatically sends location information of the mobile device on an ongoing basis. This allows the communication device to track the location of the mobile device. In some implementations, a GPS receiver used for determining the location information of the mobile device is turned on if it is off at the time of the request. Also, at step 9-3 the mobile device executes a user notification indicating that its location is being tracked.

If at step 9-4 the mobile device receives a message indicating that location information of the mobile device is not needed, then at step 9-5 the mobile device ceases to send location information of the mobile device on the ongoing basis. Also, at step 9-6 the mobile device executes a user notification indicating that the location of the mobile device is no longer being tracked. The mobile device might receive the message for example if a tracking application that uses the location information is no longer running or is otherwise not presently tracking the location of the mobile device.

In some implementations, as indicated at step 9-7, the mobile device turns off a GPS receiver used for determining the location information of the mobile device if the GPS receiver is not needed for any other purpose. Turning off the GPS receiver can reduce power consumption for the mobile device. The GPS receiver can be turned back on if for example the mobile device later receives notification that another device needs its location.

In some implementations, the method returns to step 9-1 at a later time if the mobile device receives another request for location information of the mobile device on an ongoing basis. In other words, the method can repeat itself.

In the examples presented herein, reference is made to a mobile device automatically sending location information of the mobile device on an "ongoing basis". In some implementations, the ongoing basis is periodic. However, it is to be understood that the ongoing basis can be irregular and might be dependent upon one or more events or variables. For example, an update of location information of a mobile device might be received only whenever the mobile device moves a specified distance. Regardless, location information is provided automatically without any specific request except for an initial request for automatically receiving location information on an ongoing basis.

The method described above with reference to FIG. 9 notifies a user in real-time when its location is being tracked by another device. This involves determining whether the location is being tracked based on sending or not sending location information in accordance with various signaling, namely the request at step 9-1 and the message at step 9-4. The signaling can originate from a server in the case of server-based communication, or from a communication device that tracks the location of the mobile device in the case of peer-to-peer communication. An example of how the signaling is generated is described below.

Figure 10:
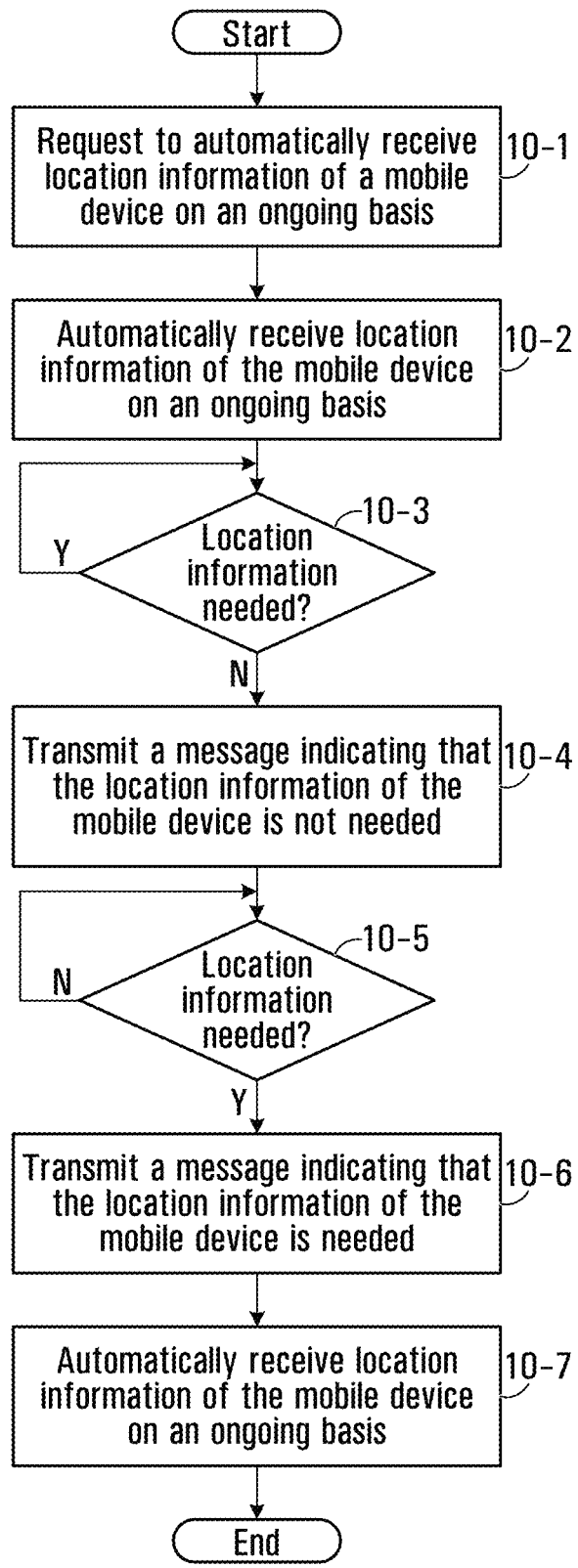
FIG. 10 is a flowchart of a method of obtaining location information of a mobile device only when the location information is needed.

Referring now to FIG. 10, shown is a flowchart of a method of obtaining location information of a mobile device only when the location information is needed. This method may be implemented in server, for example by the location tracking informer 67 of the server 65 shown in FIG. 2. Alternatively, this method may be implemented in a communication device (e.g. first communication device 30 shown in FIG. 1) that tracks the location of the mobile device. More generally, this method may be implemented in any appropriately configured apparatus.

In some implementations, as indicated at step 10-1, the apparatus requests to automatically receive location information of the mobile device on an ongoing basis. Upon receiving the request, the mobile device starts to provide location information on an ongoing basis. Therefore, at step 10-2, the apparatus automatically receives location information of the mobile device on an ongoing basis. The location information might for example be used by an application tracking the geographic location of the mobile device.

At step 10-3, the apparatus determines whether location information of the mobile device is needed. This might for example involve determining whether the location information is presently needed. In specific implementations, this involves determining whether an application that uses the location information is no longer running or is otherwise not presently tracking the location of the mobile device. Alternatively, or additionally, a determination might be made as to whether the location information is expected to be needed at some future time. In accordance with an embodiment of the disclosure, if the location information of the mobile device is not needed, then at step 10-4 the apparatus transmits a message indicating that the location information of the mobile device is not needed. Upon receiving the message, the mobile device stops providing location information to the apparatus on an ongoing basis. This avoids excessive messaging by avoiding location messages that are not needed. This also serves to inform the mobile device that its location is not being tracked.

Later at step 10-5 the apparatus determines whether location information of the mobile device is needed. This might for example involve determining whether the application that uses the location information has been re-executed or is otherwise not tracking the location of the mobile device. If location information of the mobile device is needed, then at step 10-6 the apparatus transmits a message indicating that the location information of the mobile device is needed. Upon receiving the message, the mobile device continues to provide location information on an ongoing basis. At step 10-7, the apparatus automatically receives the location information on an ongoing basis. Thus, the application that uses the location information can continue to use the location information for tracking purposes.

In some implementations, the method returns to step 10-3 so that the apparatus can determine at a later time whether location information of the mobile device is needed. In other words, the method can repeat itself.

User Interface

Figure 11:
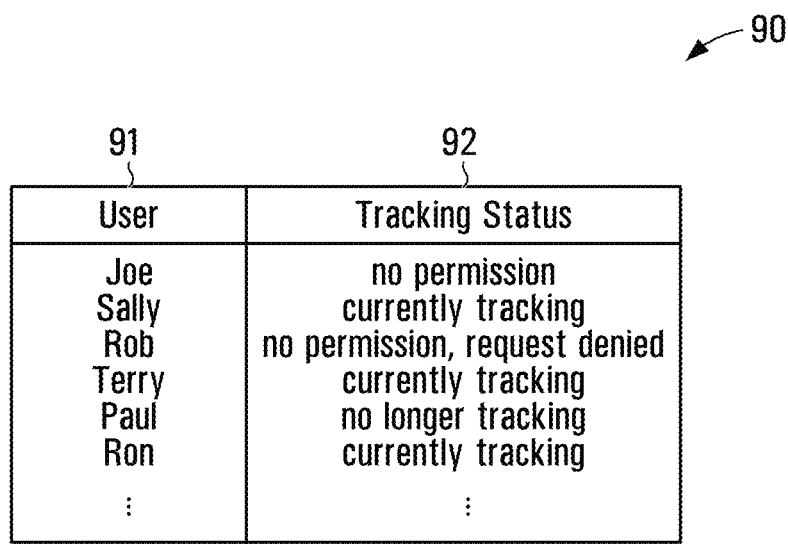
FIG. 11 schematic of an example graphic user interface (GUI) for notifying a user in real-time when its location is being tracked.

Referring now to FIG. 11, shown is a schematic of an example graphic user interface (GUI) 90 for notifying a user in real-time when its location is being tracked. The GUI 90 might for example be displayed by a mobile device, for example by the mobile device 10 shown in FIG. 1 or by the mobile device 50 shown in FIG. 2. It is to be understood that the GUI 90 is shown with specific features and specific information for exemplary purposes only.

The GUI 90 includes a list 91 of users and a respective tracking status 92 for each user. In this example, Joe has no permission to track the location of the mobile device. Sally has permission to track the location of the mobile device and is currently tracking the location of the mobile device. Rob has no permission to track the location of the mobile device, but has nonetheless requested location information. The request was denied and therefore the tracking status 92 indicates "no permission, request denied." Terry has permission to track the location of the mobile device and is currently tracking the location of the mobile device. Paul has permission to track the location of the mobile device and was tracking the location of the mobile device but has recently stopped. Ron has permission to track the location of the mobile device and is currently tracking the location of the mobile device.

Whilst the GUI 90 is shown to indicate permissions, it is noted that the GUI 90 also provides an indication of who or what is tracking their location. This goes beyond merely informing of who has permission to track their location, as the user is provided with a real-time indication of who or what is tracking their location.

Note that the tracking status 92 for each user 91 is text-based. Alternatively, or additionally, icons or other visual graphics can be displayed for indicating the tracking status 92. More generally, any indication can be displayed from which the user can determine who or what is tracking their location. Whilst a tracking status is provided for each of a plurality different users, it is to be understood that alternative implementations are possible.

Another Mobile device

Figure 12:
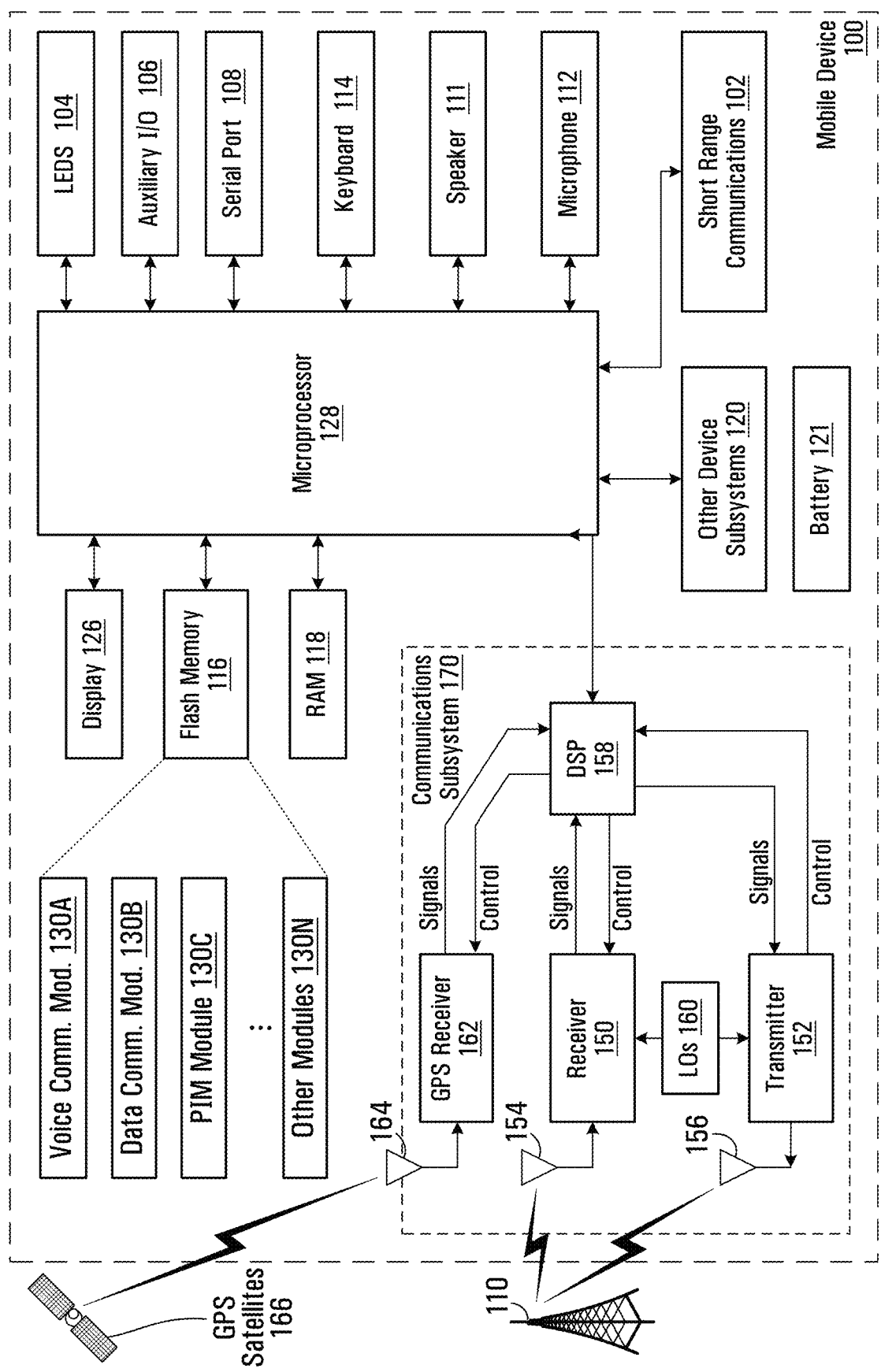
FIG. 12 is a block diagram of a mobile device.

Referring now to FIG. 12, shown is a block diagram of another mobile device 100 that may implement any of the device methods described herein. The mobile device 100 is shown with specific components for implementing features similar to those of the mobile device 10 shown in FIG. 1 or the mobile device 50 shown in FIG. 2. It is to be understood that the mobile device 100 is shown with very specific details for exemplary purposes only.

A processing device (a microprocessor 128) is shown schematically as coupled between a keyboard 114 and a display 126. The microprocessor 128 is a type of processor with features similar to those of the processor 13 of the mobile device 10 shown in FIG. 1 or the processor 53 of the mobile device 50 shown in FIG. 2. The microprocessor 128 controls operation of the display 126, as well as overall operation of the mobile device 100, in response to actuation of keys on the keyboard 114 by a user.

The mobile device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

The flash memory 116 stores computer executable instructions for implementing features similar to those of the location tracking notifier 14 of the mobile device 10 shown in FIG. 1 or the location tracking notifier 54 of the mobile device 50 shown in FIG. 2. In a specific implementation, the other module 130N of the flash memory 116 stores computer executable instructions that when executed implement a location tracking notifier. Note that the implementations described with reference to FIG. 12 are very specific for exemplary purposes.

Communication functions, including data and voice communications, are performed through the communication subsystem 170, and possibly through the short-range communications subsystem 102. The communication subsystem 170 includes a receiver 150, a transmitter 152, a GPS receiver 162, and one or more antennas, illustrated as a receive antenna 154 and a transmit antenna 156, and a GPS antenna 164. In addition, the communication subsystem 170 also includes a processing module, such as a digital signal processor (DSP) 158, and local oscillators (LOs) 160. The communication subsystem 170 having the transmitter 152 and the receiver 150 is a wireless access radio with features similar to those of the wireless access radio 11 of the mobile device 10 shown in FIG. 1 or the wireless access radio 51 of the mobile device 50 shown in FIG. 2. The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1× EV-DO. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Numerous modifications and variations of the present disclosure are possible in light of the above teachings. It is therefore to be understood that within the scope of the appended claims, the disclosure may be practised otherwise than as specifically described herein.

We claim:

1. A method for execution in a mobile device, the method comprising:
   determining location information of the mobile device;
   determining that the location information meets a condition for providing the location information; and
   in response to determining that the location information meets the condition, providing the location information to at least one other device, and executing a user notification at the mobile device indicating that the location of the mobile device is being tracked.

2. The method of claim 1, wherein the condition is a minimum distance, and the location information meets the condition when the location information indicates that the mobile device has moved at least the minimum distance.

3. The method of claim 2, wherein the minimum distance is a minimum distance from a previous position of the mobile device.

4. The method of claim 1, wherein the condition is a distance from an object, and the location information meets the condition when the location information indicates that the mobile device is within the distance from the object.

5. The method of claim 1, wherein the condition is a geofence, and the location information meets the condition when the location information indicates that the mobile device has left the geofence.

6. The method of claim 1, wherein the at least one other device is a server.

7. The method of claim 6, further comprising:
   receiving from the server a message indentifying who or what is tracking the location of the mobile device.

8. The method of claim 1, further comprising:
   if the location information is being provided to a server, receiving a message from the server identifying who or what is tracking the location of the mobile device;
   wherein executing the user notification comprises identifying who or what is tracking the location of the mobile device.

9. A non-transitory computer readable medium having computer executable instructions stored thereon for execution on a processor of a mobile device to cause the processor to:
   determine location information of the mobile device;
   determine that the location information meets a condition for providing the location information; and
   in response to the determination that the location information meets the condition, provide the location information to at least one other device, and execute a user notification at the mobile device that indicates that the location of the mobile device is being tracked.

10. The non-transitory computer readable medium of claim 9, wherein the condition comprises at least one of:
a minimum distance, and the location information meets the condition when the location information indicates that the mobile device has moved at least the minimum distance;
a distance from an object, and the location information meets the condition when the location information indicates that the mobile device is within the distance from the object; or
a geofence, and the location information meets the condition when the location information indicates that the mobile device has left the geofence.

11. A mobile device comprising:
a processor; and
a location tracking informer configured to:
determine location information of the mobile device;
determine that the location information meets a condition for providing the location information; and
in response to the determination that the location information meets the condition, provide the location information to at least one other device, and execute a user notification at the mobile device that indicates that the location of the mobile device is being tracked.

12. The mobile device of claim 11, wherein the condition is a minimum distance, and the location information meets the condition when the location information indicates that the mobile device has moved at least the minimum distance.

13. The mobile device of claim 12, wherein the minimum distance is a minimum distance from a previous position of the mobile device.

14. The mobile device of claim 11, wherein the condition is a distance from an object, and the location information meets the condition when the location information indicates that the mobile device is within the distance from the object.

15. The mobile device of claim 11, wherein the condition is a geofence, and the location information meets the condition when the location information indicates that the mobile device has left the geofence.

16. The mobile device of claim 11, wherein the at least one other device is a server.

17. The mobile device of claim 16, wherein the location tracking informer is configured to:
receive from the server a message identifying who or what is tracking the location information of the mobile device.

18. The mobile device of claim 11, wherein the location tracking informer is configured to:
if the location information is being provided to a server, receive a message from the server identifying who or what is tracking the location of the mobile device;
wherein the location tracking informer being configured to execute the user notification comprises the location tracking informer being configured to identify who or what is tracking the location of the mobile device.

* * * * *